United States Patent [19]
Köder et al.

[11] 4,094,394
[45] June 13, 1978

[54] CLUTCH THROW-OUT DEVICE

[75] Inventors: Walter Köder; Reinhart Hillmann, both of Schweinfurt, Germany

[73] Assignee: SKF Kugellagerfabriken GmbH, Schweinfurt, Germany

[21] Appl. No.: 783,005

[22] Filed: Mar. 30, 1977

[30] Foreign Application Priority Data

Apr. 10, 1976 Germany .................. 7611433[U]

[51] Int. Cl.$^2$ ............................ F16D 19/00
[52] U.S. Cl. ............................ 192/98; 192/110 B
[58] Field of Search .............. 192/98, 110 B; 308/233

[56] References Cited
U.S. PATENT DOCUMENTS

| | | | |
|---|---|---|---|
| 3,921,775 | 11/1975 | Matyschik | 192/98 |
| 3,967,710 | 7/1976 | Ernst et al. | 192/110 B X |
| 4,013,327 | 3/1977 | Kunkel et al. | 192/98 X |

Primary Examiner—Edgar W. Geoghegan
Attorney, Agent, or Firm—Daniel M. Rosen

[57] ABSTRACT

A clutch throw-out device has a thrust bearing and a pressure plate. A radially extending flange on one of the bearing rings of the thrust bearing is coupled to the pressure plate, to inhibit relative rotation therebetween. The coupling includes projections on one of the flange or pressure plate extending into corresponding recesses of the other member at the coupling. The recesses are adequately large to permit radial movement, and elastic damping means are provided at least between the recesses and projections.

9 Claims, 4 Drawing Figures

CLUTCH THROW-OUT DEVICE

BACKGROUND OF THE INVENTION

This invention relates to clutch throw-out devices of the type having self-centering clutch thrust bearings. The invention is more particularly directed to this form of device wherein a radially directed flange on one of the bearing rings engages a pressure plate, to inhibit relative rotation of the corresponding bearing ring.

Clutch throw-out devices of this type are well known. In such devices, relative rotation between the fixed ring of the bearing and the pressure plate is inhibited by providing projections on one of these members, the projections extending into corresponding recesses in the other of these members. The coupling between these members is sufficiently loose that some play exists between the projections and the corresponding recesses. Since the ring of the bearing and the pressure plate are metallic, these arrangements have the disadvantage that loud noises are produced in operation of the clutch throw-out device, due to the striking of metal parts one against the other. In addition, known arrangements of this type are relatively complicated and expensive to produce, since the radial flanges are on the outer bearing ring, and must be held by a pair of cup springs against the radially extending flange part of the pressure plate or housing of the device.

SUMMARY OF THE INVENTION

The present invention is therefore directed to the production of a clutch throw-out device of the above described type, wherein the generation of noise due to the contact between metal parts is avoided, and wherein the device may be fabricated in a simple and inexpensive manner.

Briefly stated, in accordance with the invention, the flange of the bearing ring is provided with projections, which extend into engagement in known manner with corresponding recesses of the pressure plate, the engagement permitting large radial play between these elements. Alternatively, of course, the projections may be on the pressure plate, positioned to engage corresponding recesses in the bearing flange. In accordance with the invention, elastic elements, for example, of a plastic material, are arranged between the bearing flange and the pressure plate at the recesses.

In accordance with one embodiment of the invention, the elastic elements are comprised of a thin sheet of an elastic material between the radially extending surfaces of the pressure plate and the fixed bearing ring, the elastic material extending over, and hence being bowed outwardly over the projections. As a consequence, the elastic material extends into the corresponding recesses, to avoid metal-to-metal contact at the interconnection.

In accordance with a further embodiment of the invention the elastic elements are comprised of elastic bushings closely fit into the recesses, whereby the projections extend into the central holes of the bushings to inhibit metal-to-metal contact between the projections and the walls of the recesses. In this arrangement, as an example, projections such as an annular radially inwardly extending ring may be provided in the recess to hold the bushing in position.

In order that the invention will be more clearly understood, it will now be disclosed in greater detail, with reference to the accompanying drawings, wherein:

FIG. 2b is an enlarged cross-sectional view of a modification of the device of FIG. 2a; and FIG. 3 is an enlarged cross-sectional view of a further modification of the device of FIG. 2a.

DETAILED DESCRIPTION OF THE INVENTION

Figure 1:
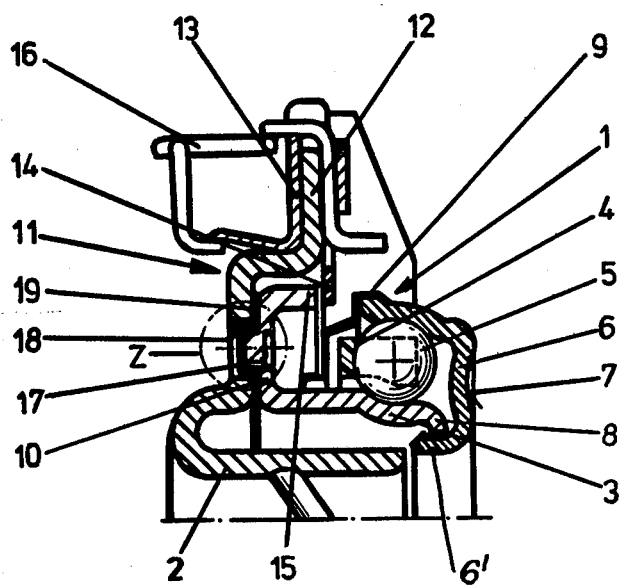
FIG. 1 is a cross-sectional view of a bushing of a clutch throw-out device on one side of the central axis thereof, in accordance with one embodiment of the invention.

Referring now to the drawings, and more in particular to FIG. 1, therein is illustrated a clutch throw-out device having a self-centering clutch thrust bearing 1. The bearing 1 is mounted to be radially movable on a housing 2.

The clutch thrust bearing is comprised of an inner ring 3 formed, for example, of sheet metal, the outer ring 6 of the bearing may also be fabricated of sheet metal. A plurality of balls 5 are mounted to run in races formed in the inner and outer rings, and a cage 4 is provided for holding the balls 5. The outer ring 6 has a radially inwardly extending concave surface 7 adapted to engage a clutch lever (not shown). In addition, the radially inner portion of the outer ring extends axially inwardly of the end of the inner ring 3. At this portion of the bearing, the edge of the inner ring 3 extends radially inwardly, as illustrated at 8, and the edge 6' of the outer ring extends axially in the bore of the bearing structure, inwardly of the edge 8 of the inner ring, to inhibit separation of the inner and outer rings. Thus, as illustrated, the extreme edge 6' of the outer ring 6 may extend radially outwardly, whereby a play exists between the bent end 6' of the outer ring and the edge 8 of the inner ring. This construction also enables sealing of the bearing.

A further seal, such as a sheet metal cover 9, seals the other side of the bearing between the inner and outer rings.

As opposed to known constructions of this type, the inner ring 3 is provided with a radially outwardly extending flange 10, beyond the seal 9, and the radially outer portion of the flange 10 is bent to extend axially back towards the bearing rings, as illustrated at 15.

The radially extending flange 10 is adjacent a radially extending portion of a pressure plate 11. The pressure plate 11 has an axially extending portion radially overlying the axially extending portion 15 of the inner ring flange, and is joined to a radially extending outer flange portion 12 of the pressure plate. The pressure plate 11 is formed on the housing 2.

Clamps or clips 13 are provided on the flange 12, the clips 13 having radially inwardly extending portions 14 extending generally into axial alignment with the axially extending portion 15 of the inner ring. The clips 13 thereby inhibit relative axial separation of the bearing structure 1 from the housing 2. In addition, the clips have spring portions 16 for affixing the device to conventional clutch actuating structures (not shown).

Figure 2A:
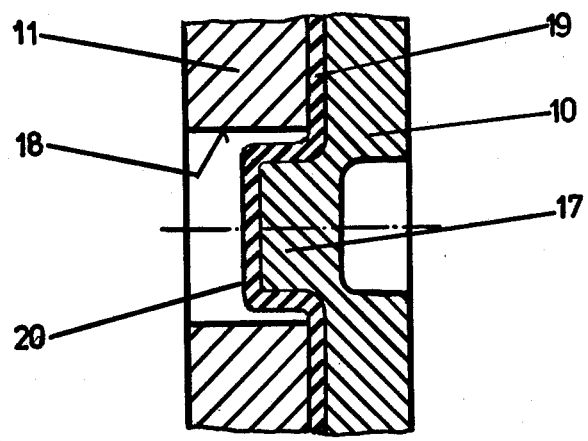
FIG. 2a is an enlarged cross-sectional view of the bushing of the device of FIG. 1 within the circle Z.

As illustrated in FIGS. 1 and 2a, the flange 10 of the inner ring is provided with a number of projections 17 distributed about its circumference, the projections extending axially into corresponding recesses 18 in the pressure plate to inhibit relative rotation between the pressure plate and the flange 10. As a consequence, the inner ring 3 of the bearing structure is inhibited from rotating.

In order to inhibit the generation of noise due to the throwing in and out of the clutch, a thin elastic sheet 19 is provided between the radially extending surfaces of the pressure plate 11 and the flange 10. The sheet 19, which may be of a plastic material, extends over the projections 17, and is hence bowed out in this region by the projections 17, so that the elastic material extends into the recesses 18. The elastic piece 19 thereby inhibits metal-to-metal contact between the projections 17 and the surfaces of the recesses 18, so that any relative circumferential movement between the elements does not result in the generation of noise due to metal-to-metal contact between the elements of the device.

The outer diameter of the projections 17 and the inner diameter of the recesses 18 are separated, so that the inner ring 3 can position itself freely in the radial direction. The elastic pieces 19 also serve to damp any relatively large relative movement, in the radial direction, between the housing 2 and the clutch thrust bearing 1.

Figure 2B:
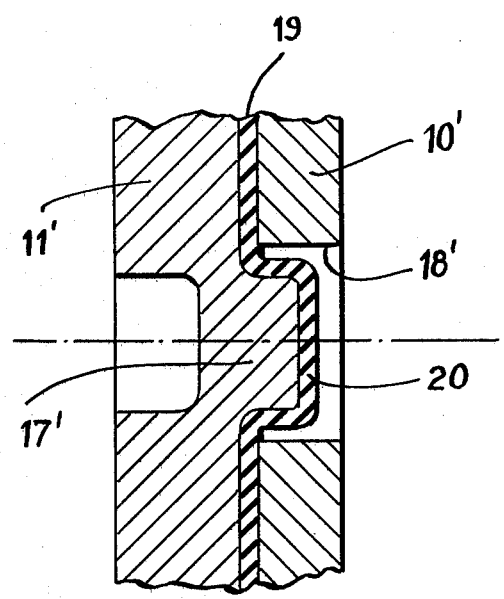

In the modification of the invention illustrated in FIG. 2b, the projections 17' are alternatively provided on the pressure plate 11', and the recesses 18' are provided in the flange 10'. In this arrangement, the elastic piece 19 thereby extends around the projections 17', as illustrated at 20 to extend into the recesses 18' in the flange 10' of the inner ring.

With the above constructions of a device in accordance with the invention, it is apparent that the inner ring of the bearing may be economically formed with a flange which can be held against separation from the pressure plate, and that, in accordance with the invention, these two elements can be coupled together in a noise-free manner against relative rotation without inhibiting relative radial movement. Furthermore, in a construction in accordance with the invention, the outer bearing ring may be coupled in a simple and inexpensive manner with respect to the inner bearing ring, while still providing a surface for engagement with the clutch lever.

Figure 3:
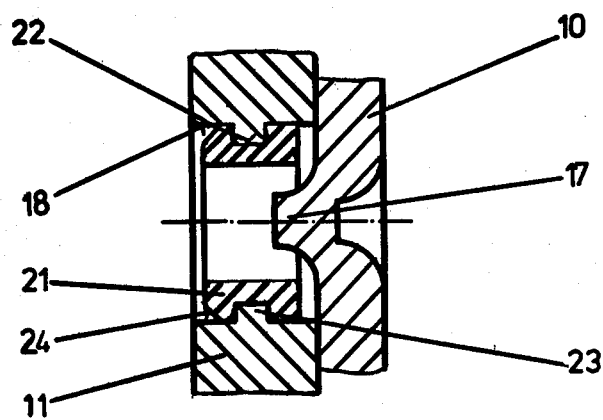

In a further embodiment of the invention, as illustrated in FIG. 3, the recesses 18 in the pressure plate 11 are lined with elastic bushings 21. The bushings 21 may, for example, be of a plastic material. In accordance with this embodiment of the invention, the bushings 21 are held, in a close fitting manner, against the inner surfaces of the recesses. In order to hold the bushings in the recesses, the bushings 21 may be provided with annular grooves 22 in their outer surfaces, these grooves engaging radially inwardly extending projections, such as rings 23, of the inner surfaces of the recesses. The projections 17 of the flange 10 thereby extend into the central portions of the bushings 21, to inhibit metal-to-metal contact between the projections 17 and the inner walls of the recesses. It will, of course, be apparent that other techniques may be employed for holding the elastic bushings in the recesses.

In order to enable the bushings 21 to be readily snapped in position, these bushings may be provided with bevels 24 at one end of their radially outer surfaces.

While the invention has been disclosed and described with reference to a limited number of embodiments, it will be apparent that variations and modifications may be made therein, and it is intended in the following claims to cover each such variation and modification as falls within the true spirit and scope of the invention.

What is claimed is:

1. In a clutch throw-out device having a self-centering thrust bearing with a fixed bearing ring, the fixed bearing having a radially extending flange, a pressure plate, and means coupling said pressure plate to said flange to inhibit relative rotation between said flange and pressure plate, the improvement wherein said coupling means comprises projection means on one of said plate and flange and positioned to extend into a recess in the other of said plate and flange, said recess being sufficiently large to permit substantial radial play between said projection means and recess, and elastic means in said recess between said pressure plate and projection means.

2. The device of claim 1, wherein said elastic means comprises a thin elastic sheet between the radially extending portions of said pressure plate and flange, said elastic sheet extending over and being bowed-out at said projection means.

3. The device of claim 2, wherein said projection means extend axially from said flange into corresponding recesses in said pressure plate.

4. The device of claim 2, wherein said projection means extend axially from said pressure plate into corresponding recesses in said flange.

5. The device of claim 1, wherein said elastic means comprises elastic bushings closely fit in said recesses.

6. The device of claim 5, wherein said bushings have annular grooves in their outer surfaces, and said recesses have radially inwardly extending projections extending into said grooves for holding said bushings in said recesses.

7. The device of claim 6, wherein said bushings have beveled outer edges at one end thereof.

8. The device of claim 1, wherein said fixed bearing ring comprises an inner bearing ring, said flange extending radially outwardly from one end of said inner bearing ring and having an axially extending end portion extending toward said bearing, and further comprising clip means on said pressure plate for inhibiting axial separation of said bearing and pressure plate.

9. The device of claim 8, wherein said bearing further comprises an outer bearing ring, and a plurality of balls between said inner and outer bearing rings, said outer bearing ring having an inwardly extending flange portion extending inwardly of the other end of said inner bearing ring, and bent to inhibit separation of said inner and outer bearing rings in the axial direction.

* * * * *